(12) United States Patent
Wakuda et al.

(10) Patent No.: US 10,191,563 B2
(45) Date of Patent: Jan. 29, 2019

(54) MANIPULATION INPUT DEVICE THAT DETECTS A MANIPULATION FORCE TO MOVE A MANIPULATION MEMBER

(71) Applicant: ALPS ELECTRIC CO., LTD., Tokyo (JP)

(72) Inventors: Hiroshi Wakuda, Miyagi-ken (JP); Kazuhiko Hiratsuka, Miyagi-ken (JP); Hiroyuki Bannai, Miyagi-ken (JP); Taichi Miyabayashi, Miyagi-ken (JP); James Ogrady, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 15/671,458

(22) Filed: Aug. 8, 2017

(65) Prior Publication Data

US 2017/0336880 A1 Nov. 23, 2017

Related U.S. Application Data

(63) Continuation of application No. PCT/JP2016/056242, filed on Mar. 1, 2016.

(30) Foreign Application Priority Data

Mar. 9, 2015 (JP) .................................. 2015-045552

(51) Int. Cl.
*G06F 3/033* (2013.01)
*G06F 3/0338* (2013.01)
(Continued)

(52) U.S. Cl.
CPC ........... *G06F 3/0338* (2013.01); *G05G 9/047* (2013.01); *G06F 3/016* (2013.01); *G06F 3/0362* (2013.01); *H01H 25/04* (2013.01)

(58) Field of Classification Search
CPC ........ G06F 3/0338; G06F 3/016; G05G 9/047
(Continued)

(56) References Cited

U.S. PATENT DOCUMENTS

2010/0045624 A1* 2/2010 Hisatsugu .......... B60H 1/00985
345/173
2011/0025651 A1* 2/2011 Buil ..................... G06F 3/03545
345/179

(Continued)

FOREIGN PATENT DOCUMENTS

JP H11-212725 A 6/1999
JP 2001-293253 A 10/2001
(Continued)

OTHER PUBLICATIONS

International Search Report for corresponding International Patent Application No. PCT/JP2016/056242, dated May 24, 2016, pp. 1-4.

*Primary Examiner* — Jonathan M Blancha
(74) *Attorney, Agent, or Firm* — Brinks Gilson & Lione

(57) ABSTRACT

A manipulation input device has a first detector and a second detector, disposed at different positions on a manipulative member, that detect the displacement of the manipulative member, the displacement being caused when the manipulative member receives a manipulation force, and also has a processor that performs processing to identify a position at which the manipulative member has received the manipulation force according to detection results obtained from the first detector and second detector and to the positions of the first detector and second detector on the manipulative member.

4 Claims, 7 Drawing Sheets

(51) Int. Cl.
*H01H 25/04* (2006.01)
*G05G 9/047* (2006.01)
*G06F 3/01* (2006.01)
*G06F 3/0362* (2013.01)

(58) Field of Classification Search
USPC .......................................................... 345/161
See application file for complete search history.

(56) References Cited

U.S. PATENT DOCUMENTS

| | | | | |
|---|---|---|---|---|
| 2011/0234522 A1* | 9/2011 | Lin | ..................... | G06F 3/04883 345/173 |
| 2013/0314378 A1* | 11/2013 | Chang | ................... | G06F 3/0416 345/175 |

FOREIGN PATENT DOCUMENTS

| | | |
|---|---|---|
| JP | 2010-015514 A | 1/2010 |
| JP | 2013-047871 A | 3/2013 |

\* cited by examiner

US 10,191,563 B2

MANIPULATION INPUT DEVICE THAT DETECTS A MANIPULATION FORCE TO MOVE A MANIPULATION MEMBER

CLAIM OF PRIORITY

This application is a Continuation of International Application No. PCT/JP2016/056242 filed on Mar. 1, 2016, which claims benefit of priority to Japanese Patent Application No. 2015-045552 filed on Mar. 9, 2015. The entire contents of each application noted above are hereby incorporated by reference in their entireties.

BACKGROUND

1. Field of the Disclosure

The present disclosure relates to a manipulation input device that can detect an input manipulation in a rotational direction.

2. Description of the Related Art

Japanese Unexamined Patent Application Publication No. 2013-47871 discloses a manipulation input device. Here, by manipulating a cap member at the top, a cap part is inclined in a direction in which the cap part has been manipulated and a detecting part disposed in the direction of the inclination detects a change in pressing force, the change having been caused by the inclination of the cap part, so the manipulation input device detects the manipulation without providing a manipulation feeling to the user.

In the conventional technology, however, although the direction of a manipulation made by the user can be detected from the inclination direction of the cap part, it is difficult to detect a rotational direction.

SUMMARY

A manipulation input device has a first detector and a second detector, disposed at different positions on a manipulative member. The first and second detectors detect the displacement of the manipulative member, the displacement being caused when the manipulative member receives a manipulation force. A processor performs processing to identify a position at which the manipulative member has received the manipulation force according to detection results obtained from the first detector and second detector and to the positions of the first detector and second detector on the manipulative member.

According to the structure described above, since the first detector and second detector, disposed at different positions on the manipulative member, detect the displacement of the manipulative member, the displacement being caused when the manipulative member receives a manipulation force, it is possible to identify a position at which the manipulative member has received the manipulation force according to detection results obtained from the first detector and second detector and to the positions of the first detector and second detector on the manipulative member. It is also possible to identify the rotational direction of the manipulative member from the position at which the manipulative member has received the manipulation force.

DESCRIPTION OF THE EXEMPLARY EMBODIMENTS

Embodiments of the present invention will be described below in detail with reference to the drawings.

Figure 1:
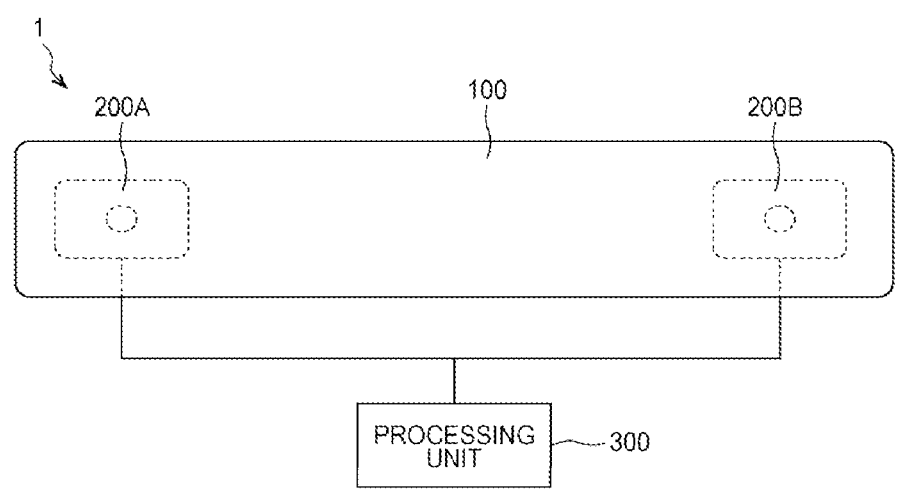
FIG. 1 is a plan view of a manipulation input device according to an embodiment of the present invention.
Figure 2:
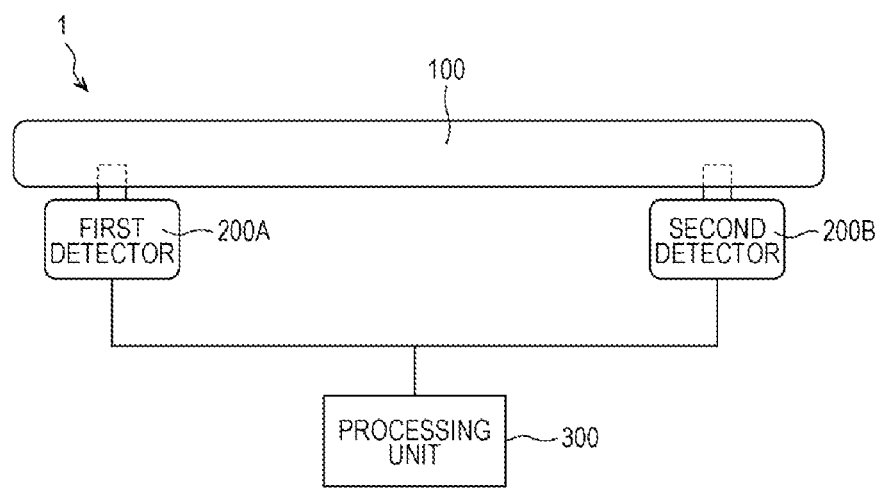
FIG. 2 is a side view of the manipulation input device according to an embodiment of the present invention.

FIG. 1 is a plan view of a manipulation input device 1 according to the embodiment. FIG. 2 is a side view of the manipulation input device 1 according to an embodiment. The manipulation input device 1 has a manipulative member 100, a first detector 200A, a second detector 200B, and a processor 300.

The manipulative member 100, having a bar-like shape, accepts a manipulation input by the user. The first detector 200A is engaged with the manipulative member 100 in the vicinity of an end of the manipulative member 100, and the second detector 200B is engaged with the manipulative member 100 in the vicinity of the other end of the manipulative member 100.

The first detector 200A and second detector 200B each detect, at their engagement positions, the displacement of the manipulative member 100, the displacement being caused when the manipulative member 100 receives a manipulation force. The processor 300 is, for example, a processing circuit such as a central processing unit (CPU), a micro-processing unit (MPU), or the like. The processor 300 performs processing to identify a position at which the manipulative member 100 has received a manipulation force, its intensity, its rotational direction, and the like.

Figure 3:
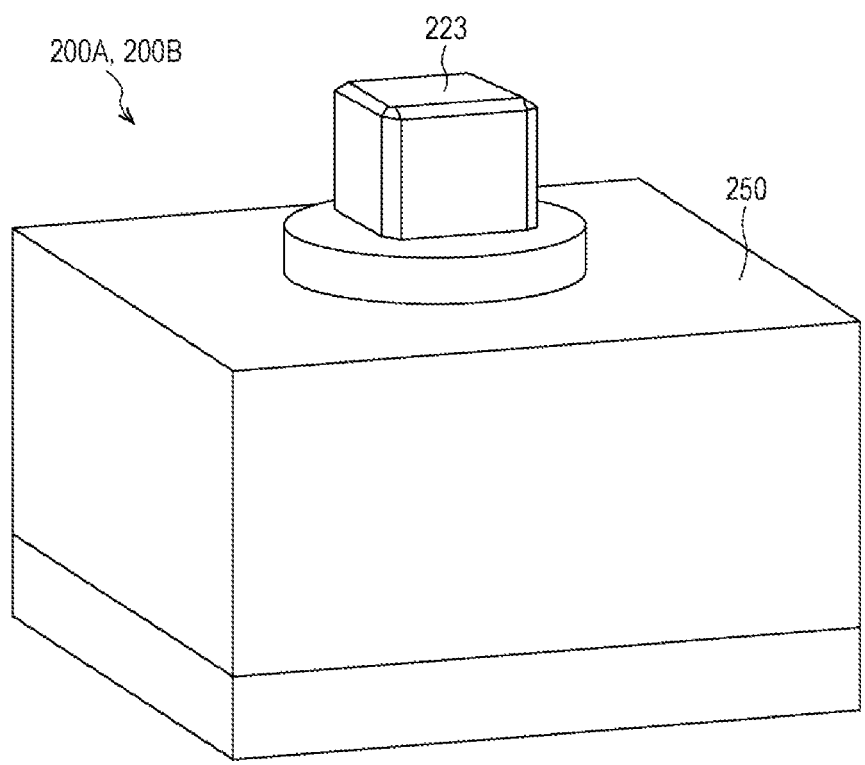
FIG. 3 is a schematic outside view of first and second detectors according to an embodiment of the present invention.
Figure 4:
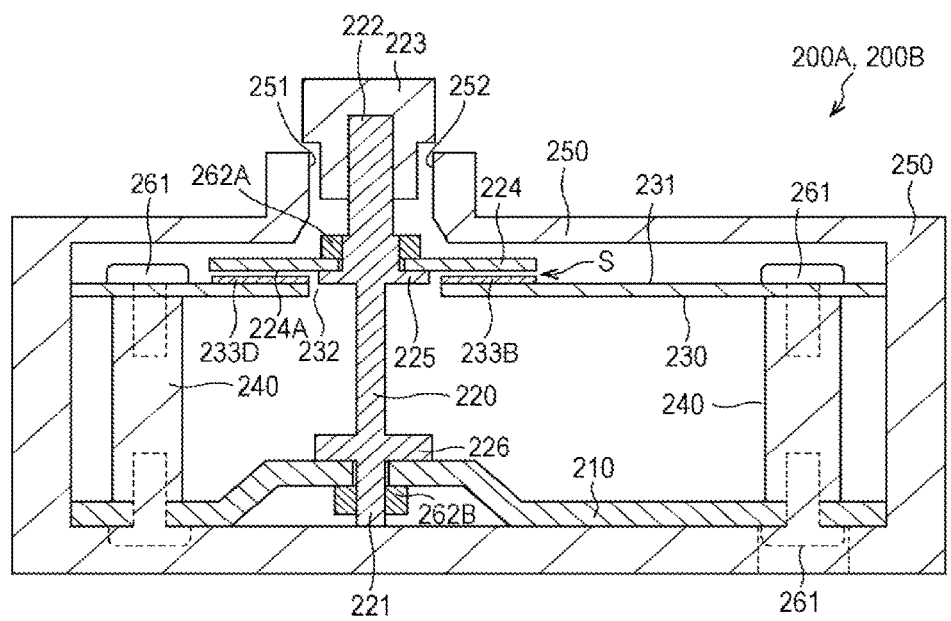
FIG. 4 is a cross-sectional view of the first and second detectors according to an embodiment of the present invention.
Figure 5:
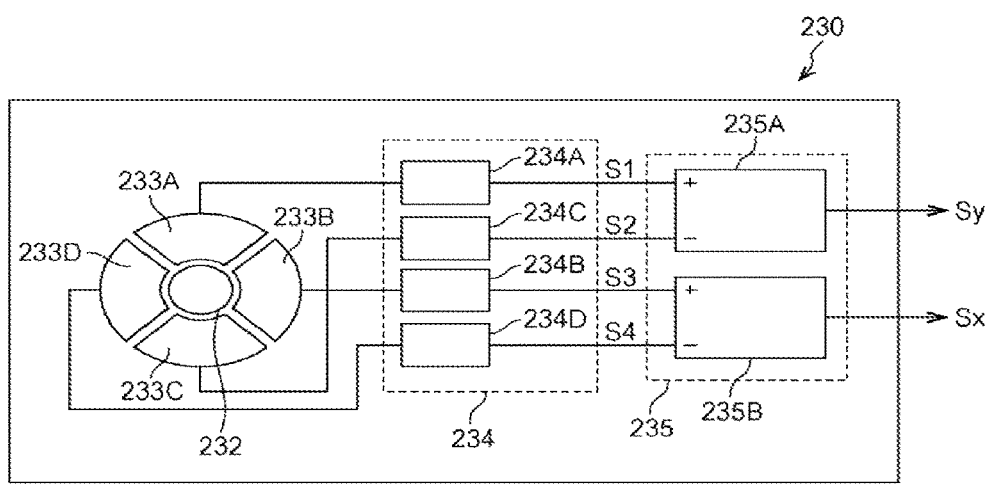
FIG. 5 is a circuit block diagram of a circuit board included in the first and second detectors according to an embodiment of the present invention.

FIG. 3 is a schematic outside view of the first detector 200A and second detector 200B. FIG. 4 is a cross-sectional view of the first detector 200A and second detector 200B. FIG. 5 is a circuit block diagram of a circuit board 230. The structures of the first detector 200A and second detector 200B will be described below with reference to FIGS. 3 to 5. The schematic outside view of the first detector 200A and second detector 200B illustrated in FIG. 3 is not limited to the example illustrated in FIG. 3.

One end 221 of a lever member 220 is secured to a base 210 and another end 222 is a free end, which is not secured, in an attitude in which the longitudinal direction of the lever member 220 extends in a direction perpendicular to the plate surface 231 of the circuit board 230. A holding part 223 is provided at the other end 222 of the lever member 220. When the user holds the holding part 223, the user can manipulate the lever member 220.

The lever member 220 also has a lever-side electrode 224. The lever-side electrode 224 has a circuit board facing surface 224A that faces a plurality of base-side electrodes 233A to 233D, described later, which are formed on the plate surface 231 of the circuit board 230 with a clearance S therebetween. The circuit board facing surface 224A of the lever-side electrode 224 is positioned in parallel to the base-side electrodes 233A to 233D formed on the plate surface 231 of the circuit board 230, and has a circular shape with the lever member 220 positioned at the center.

On the same side as the one end 221 of the lever member 220, a projecting part 225, which projects in a discoid shape in a direction perpendicular to the longitudinal direction of the lever member 220, is integrally formed. Similarly, on the same side as the other end 222, a projecting part 226, which also projects in a discoid shape in a direction perpendicular to the longitudinal direction of the lever member 220, is integrally formed. The lever-side electrode 224 is mounted on the projecting part 225 and is secured by a nut 262A.

The lever member 220 is secured so that the projecting part 226 and a nut 262B interpose the base 210 therebetween. Although, in this embodiment, the lever-side electrode 224 is separated from the lever member 220, the lever-side electrode 224 may be integrally formed as part of the lever member 220.

The circuit board 230 is secured to the base 210 with screws 261 through a plurality of supporting members 240. The circuit board 230 has a through-hole 232, through which the lever member 220 passes. On the circuit board 230, the plurality of base-side electrodes 233A to 233D, a capacitance detecting circuit 234, and an amplifying circuit 235 are provided. The base-side electrodes 233A to 233D are formed at positions at which they face the lever-side electrode 224 on the plate surface 231 of the circuit board 230.

The base-side electrodes 233A and 233C detect the operation of the lever member 220 along the Y axis (vertical direction when viewed toward the drawing sheet in FIG. 4) of the circuit board 230. The base-side electrodes 233B and 233D detect the operation of the lever member 220 along the X axis (horizontal direction when viewed toward the drawing sheet in FIG. 4) of the circuit board 230. In FIG. 4, a virtual X-Y coordinate system in which the center of the through-hole 232 in the circuit board 230 is set to a zero point is set.

The capacitance detecting circuit 234 detects a capacitance formed by the base-side electrodes 233A to 233D and lever-side electrode 224. Specifically, the capacitance detecting circuit 234 has four charge amplifiers 234A to 234D, which respectively convert charge signals output from the base-side electrodes 233A to 233D to voltage signals and output them.

The amplifying circuit 235 has two differential amplifying circuits 235A and 235B. The differential amplifying circuit 235A takes a difference between an output from the charge amplifier 234A and an output from the charge amplifier 234C and amplifies the difference. The differential amplifying circuit 235B takes a difference between an output from the charge amplifier 234B and an output from the charge amplifier 234D and amplifies the difference. Outputs from the amplifying circuit 235, which is provided in each of the first detector 200A and second detector 200B, are input to the processor 300.

That is, an amount by which the lever member 220 has been moved in the Y-axis direction (vertical direction when viewed toward the drawing sheet in FIG. 4) is found from the output from the differential amplifying circuit 235A. An amount by which the lever member 220 has been moved in the X-axis direction (horizontal direction when viewed toward the drawing sheet in FIG. 4) is found from the output from the differential amplifying circuit 235B.

A cover 250 is secured to the base 210 and has a through-hole 251 through which the lever member 220 passes. The through-hole 251 in the cover 250 restricts a range within which the lever member 220 is movable due to its elastic deformation. That is, if a strong force exceeding a stipulated value is applied to the lever member 220, the lever member 220 abuts the inner wall 252 of the through-hole 251, preventing the lever member 220 from being excessively deformed.

The processor 300 performs processing to identify a position at which the manipulative member 100 has received a manipulation force, its intensity, its rotational direction, and the like, according to detection results obtained from the first detector 200A and second detector 200B and to the positions of the first detector 200A and second detector 200B on the manipulative member 100.

Figure 6:
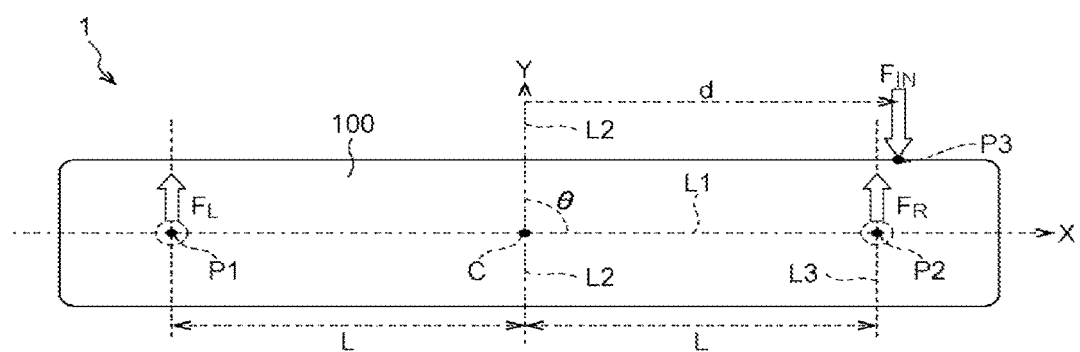
FIG. 6 is a drawing illustrating a mechanism by which the manipulation input device according to an embodiment of the present invention detects a rotational manipulation.

FIG. 6 is a drawing illustrating a mechanism by which the manipulation input device 1 detects a rotational manipulation. The mechanism by which the manipulation input device 1 detects a rotational manipulation will be described below with reference to FIG. 6. In the description below, the engagement positions, in the manipulative member 100, of the first detector 200A and second detector 200B will be respectively denoted P1 and P2, and a position at which a manipulation force was applied by the user will be denoted P3. A virtual straight line mutually connecting the positions P1 and P2 will be denoted L1, and the midpoint on the virtual straight line L1 between the positions P1 and P2 will be denoted C. A virtual straight line passing the midpoint C and extends in a direction perpendicular to the virtual straight line L1 will be denoted L2, and a distance from the midpoint C to the position P1 and a distance from the midpoint C to the position P2 will be each denoted L.

Here, a case will be considered in which a manipulation force $F_{IN}$ has been input to the manipulative member 100 at the position P3, which is apart from the virtual straight line L2 by a distance d.

Since the manipulative member 100 is secured (does not move) by the first detector 200A and second detector 200B, the manipulation force $F_{IN}$ and reaction forces $F_L$ and $F_R$, which are respectively generated at the first detector 200A and second detector 200B, are in balance.

More specifically, the sum of the components of the manipulation force $F_{IN}$ and the reaction forces $F_L$ and $F_R$ respectively generated at the first detector 200A and second detector 200B must be zero (balanced) in each of the horizontal (X axis) direction, perpendicular (Z axis) direction, and rotational (θ) direction with respect to the center C.

Therefore, equations (1) to (3) below hold. Equation (1) represents the balance in the parallel direction (X axis). Equation (2) represents the balance in the perpendicular direction (Y axis). Equation (3) represents the balance in the rotational direction (θ).

$$F_X = F_{RX} + F_{LX} \tag{1}$$

$$F_Y = F_{RY} + F_{LY} \tag{2}$$

$$F_Y \cdot d = (F_{RY} - F_{LX}) \cdot L \tag{3}$$

where $F_X$: X-axis component of the manipulation force $F_{IN}$ $F_Y$: Y-axis component of the manipulation force $F_{IN}$ $F_{LX}$: X-axis component of the reaction force $F_R$ of the first detector 200A

$F_{LY}$: Y-axis component of the reaction force $F_R$ of the first detector 200A

$F_{RX}$: X-axis component of the reaction force $F_R$ of the second detector 200B

$F_{RY}$: Y-axis component of the reaction force $F_R$ of the second detector 200B

Here, the distance L from the midpoint C to the position P1 and from the midpoint C to the position P2 can be measured in advance, the value of d can be obtained from equation (3) above.

Although, in the above description, equation (3) has been obtained from equation (1), assuming that the midpoint C on the virtual straight line L1 between the positions P1 and P2 is the reference point (zero point), the reference point (zero point) may not be the midpoint C between the positions P1 and P2, but an offset may be set and the reference point may be at a position deviated from the midpoint C.

Since the first detector 200A and second detector 200B are not disposed at positions deviated in the Y-axis direction, it is not possible to further identify the rotational component of $F_X$. To identify the rotational component of $F_X$ as well, it suffices to provide a detector at a position as well deviated in the Y-axis direction.

Figure 7:
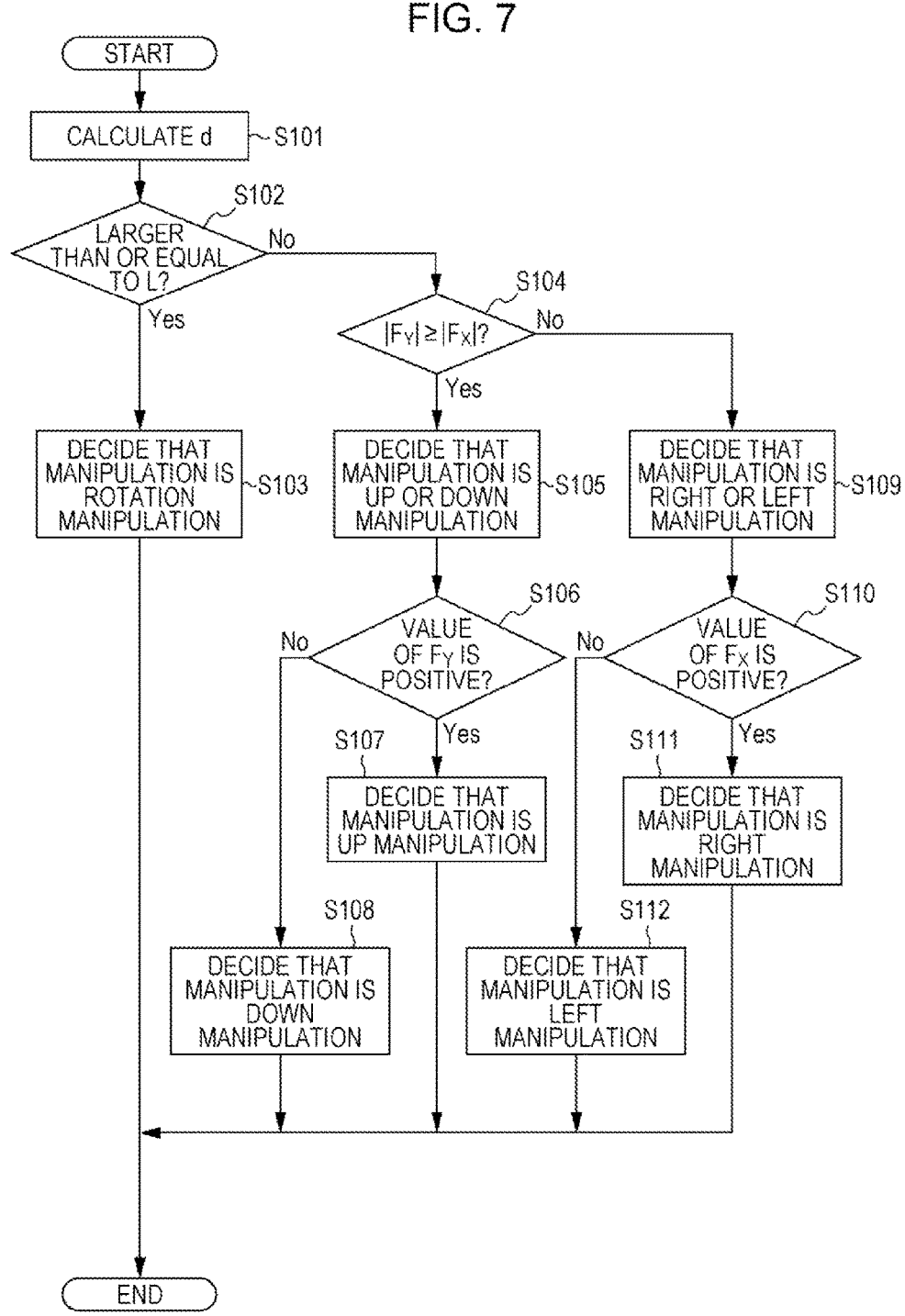
FIG. 7 is a flowchart that illustrates the operation of a processor in the manipulation input device according to an embodiment of the present invention.

FIG. 7 is a flowchart that illustrates the operation of the processor 300 in the manipulation input device 1. The operation of the processor 300 in the manipulation input device 1 will be described with reference to FIG. 7. The values of equations (1) to (3) and L are stored in advance in the processor 300 or a memory (not illustrated).

In the description below, the first detector 200A and second detector 200B are set so that they output a rightward input and a leftward input in the horizontal direction (X axis) in FIG. 6 respectively as a positive (plus) signal and a negative (minus) signal, and also output an upward input and a downward input in the vertical direction (Y axis) in FIG. 6 respectively as a positive (plus) signal and a negative (minus) signal.

First, the processor 300 calculates the value of d according to equation (3) above (step S101). The processor 300 then decides whether the calculated value of d is larger than or equal to L (step S102).

If the value of d is larger than or equal to L (the result in step S102 is Yes), the processor 300 decides that the manipulation is to rotate the manipulative member 100 (step S103).

If the value of d is smaller than L (the result in step S102 is No), the processor 300 decides whether the absolute value of $F_Y$ is larger than or equal to the absolute value of $F_X$ (step S104).

If the absolute value of $F_Y$ is larger than or equal to the absolute value of $F_X$ (the result of step S104 is Yes), the processor 300 decides that the manipulation is to move the manipulative member 100 in the vertical direction (Y axis) (step S105).

Next, the processor 300 decides whether the value of $F_Y$ is positive (step S106). If the value of $F_Y$ is positive (the result of step S106 is Yes), the processor 300 decides that the manipulation is to move the manipulative member 100 upward (step S107).

If the value of $F_Y$ is not positive (the result of step S106 is No), the processor 300 decides that the manipulation is to move the manipulative member 100 downward (step S108).

If the absolute value of $F_Y$ is neither larger than nor equal to the absolute value of $F_X$ (the result of step S104 is No), the processor 300 decides that the manipulation is to move the manipulative member 100 in the horizontal direction (X axis) (step S109).

Next, the processor 300 decides whether the value of $F_X$ is positive (step S110). If the value of $F_X$ is positive (the result of step S110 is Yes), the processor 300 decides that the manipulation is to move the manipulative member 100 rightward (step S111).

If the value of $F_X$ is not positive (the result of step S110 is No), the processor 300 decides that the manipulation is to move the manipulative member 100 leftward (step S112).

Although, in the above embodiment, the first detector 200A and second detector 200B detect a capacitance that changes depending on the amount of deviation of the manipulative member 100, the amount changing depending on the manipulation force applied by the user, another method may be used to detect the amount of deviation of the manipulative member 100; for example, a piezoelectric element may be used.

As described above, the manipulation input device 1 in this embodiment has the first detector 200A and second detector 200B, disposed at different positions on the manipulative member 100, that detect the displacement of the manipulative member 100, the displacement being caused when the manipulative member 100 receives a manipulation force, and also has the processing unit or processor 300 that performs processing to identify a position at which the manipulative member 100 has received the manipulation force according to detection results obtained from the first detector 200A and second detector 200B and to the positions of the first detector 200A and second detector 200B on the manipulative member 100. Thus, it is possible to identify a position at which the manipulative member 100 has received the manipulation force. Then, it is also possible to identify the rotational direction of the manipulative member 100 from the position at which the manipulative member 100 has received the manipulation force.

In this embodiment, the processor 300 preferably performs processing to identify the intensity of the manipulation force in a first direction (Y-axis direction) parallel to the virtual straight line L1 that mutually connects the first detector 200A and second detector 200B and in a second direction (X-axis direction) perpendicular to the first direction. Thus, the intensity of the manipulation force can be identified in the X-axis direction and Y-axis direction.

In this embodiment, the first detector 200A and second detector 200B preferably detect a capacitance that changes depending on the amount of deviation of the manipulative member 100, the amount changing depending on the manipulation force. Since amplification processing can be easily performed on the capacitance, a small amount of deviation is enough to detect a manipulation.

In this embodiment, each of the first detector 200A and second detector 200B preferably has the lever member 220, the one end 221 of which is secured to the base 210 and the other end 222 of which is manipulable, the base-side electrodes 233A to 233D secured to the base 210, the lever-side electrode 224 provided on the lever member 220, and the capacitance detecting circuit 234 that detects a capacitance formed by the base-side electrodes 233A to 233D and the lever-side electrode 224.

A capacitance is detected that changes depending on the elastic deformation of the lever member 220, the elastic deformation being caused when the lever member 220 is manipulated. Since a small space that allows the elastic deformation of the lever member 220 is sufficient as a space required to manipulate the lever member 220, the first detector 200A and second detector 200B can be made compact.

In this embodiment, each of the first detector 200A and second detector 200B preferably has the cover 250 that is secured to the base 210 and has the through-hole 251 through which the lever member 220 passes. The through-hole 251 preferably restricts the range within which the lever member 220 is movable due to its elastic deformation.

Therefore, since the range within which the lever member 220 is movable due to its elastic deformation is restricted, if a strong force exceeding a stipulated value is applied, the lever member 220 abuts the inner wall 252 of the through-hole 251, preventing the lever member 220 from being excessively deformed. Accordingly, it is possible to suppress the manipulation input device 1 from being deformed or destructed.

The present invention is not limited to the embodiment described above.

That is, a person having ordinary skill in the art may make various modifications, combinations, sub-combinations, and replacements for the constituent elements in the above embodiment, without departing from the technical range of the present invention or an equivalent range of the technical range.

For example, although, in the embodiment described above, a linear member has been taken as an example of the manipulative member 100, a manipulative member in another shape such as, for example, a bent or curved shape may be used.

Although, in the embodiment described above, a case in which two detectors, first detector 200A and second detector 200B, are attached to the manipulative member 100 has been taken as an example, three or more detectors may be attached.

Although, in the embodiment described above, a case in which the processor 300 detects a rotational manipulation, vertical manipulations, and horizontal manipulations made by the use of the manipulative member 100 as illustrated in FIG. 7 has been taken as an example, only part of these manipulations or manipulations other than these manipulations may be detected.

What is claimed is:

1. A manipulation input device comprising:
 a manipulative member;
 a first detector and a second detector disposed at different positions on the manipulative member, the first detector and the second detector each detecting displacement of the manipulative member, the displacement being caused when the manipulative member receives a manipulation force; and
 a processor performing processing to identify a position at which the manipulative member has received the manipulation force according to detection results obtained from the first detector and the second detector and to positions of the first detector and the second detector on the manipulative member; wherein:
 the processor performs processing to identify intensity of the manipulation force in a first direction parallel to a straight line mutually connecting the first detector and the second detector and in a second direction perpendicular to the first direction;
 the processor decides that:
 if a distance between the identified position and a reference position is smaller than a predetermined value, a manipulation is to rotate the manipulative member,
 if the distance between the identified position and the reference position is larger than or equal to the predetermined value and the identified intensity of the manipulation force in the first direction is larger than or equal to the identified intensity of the manipulation force in the second direction, the manipulation is to move the manipulative member in the first direction, and
 if the distance between the identified position and the reference position is larger than or equal to the predetermined value and the identified intensity of the manipulation force in the first direction is smaller than the identified intensity of the manipulation force in the second direction, the manipulation is to move the manipulative member in the second direction.

2. The manipulation input device according to claim 1, wherein the first detector and the second detector each detect a capacitance changing depending on an amount of deviation of the manipulative member, the amount changing depending on the manipulation force.

3. The manipulation input device according to claim 2, wherein:
 each of the first detector and the second detector has
 a base,
 a lever member, one end of which is secured to the base and another end of which is manipulable,
 a base-side electrode secured to the base,
 a lever-side electrode provided on the lever member, and
 a capacitance detecting circuit detecting a capacitance formed by the base-side electrode and the lever-side electrode; and
 the capacitance changes depending on the amount of deviation caused when the lever member is manipulated.

4. The manipulation input device according to claim 3, wherein each of the first detector and the second detector further has a cover secured to the base, the cover having a through-hole through which the lever member passes, the through-hole restricting a range within which the lever member is movable due to elastic deformation of the lever member.

* * * * *